7193X
C. FOSS.
SPIRAL PUMP.
Patented Aug. 4, 1832.
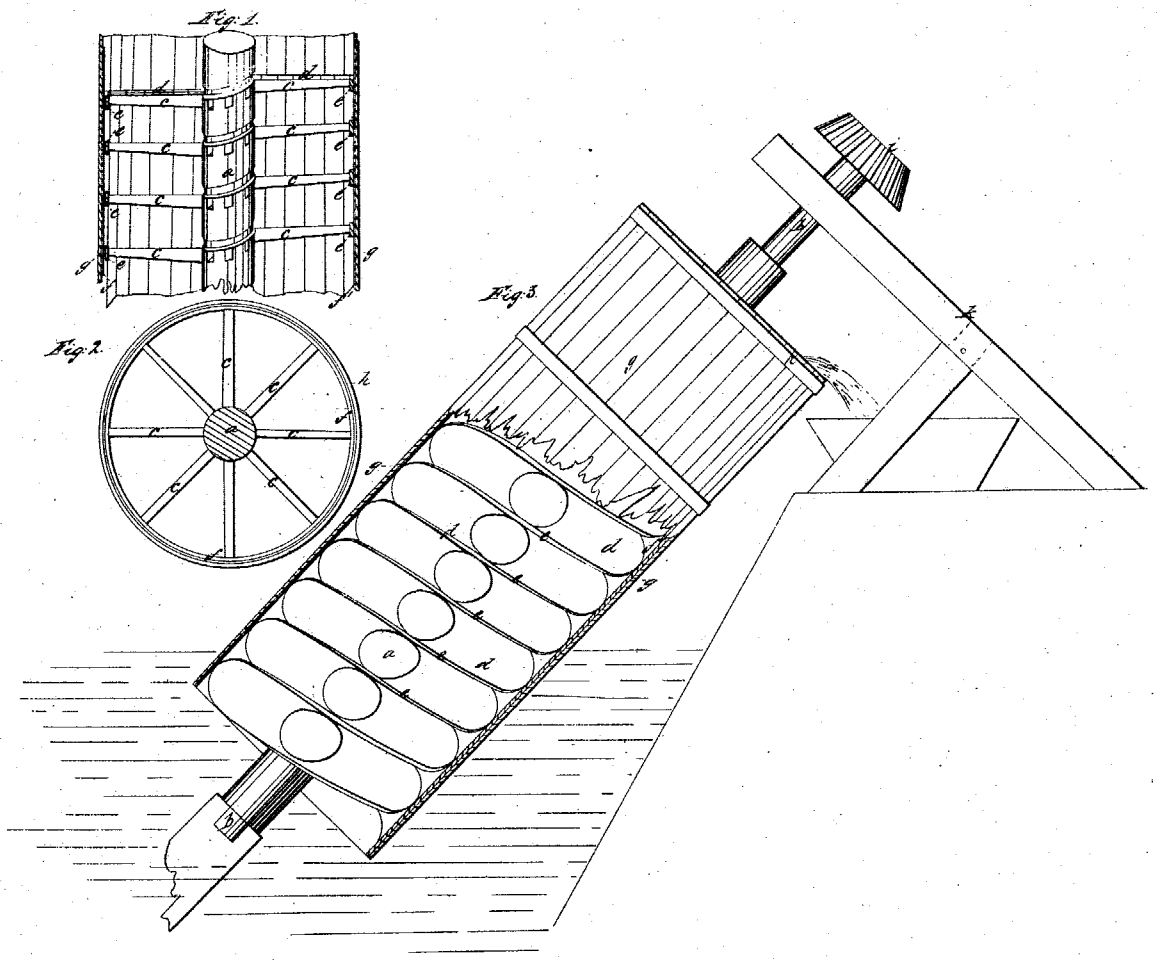
THE NORRIS PETERS CO., PHOTO-LITHO., WASHINGTON, D. C.

X 7193 Aug. 4. 1832

Collon Foss of Perry, County of Geauga, Ohio,

Letters Patent

The Schedule referred to in these Letters Patent and making part of the same containing a description in the words of the said Collon Foss. himself of his improvement in the Pump called the Spiral Pump To all to whom these presents shall come, Collon Foss of Perry, County of Geauga, and State of Ohio sends Greeting.

Be it Known that I the said Collon Foss. have invented and applied to use a new and useful improvement on the pump called the Spiral Pump; specified in the words following viz.

This improvement consists of a round shaft twenty inches in diameter and 16 feet long with gudgeons or pivots at its top & bottom sufficiently large to support the pump, on this shaft a spiral line is grooved out, extending from the top to the bottom of such depth and width as shall fit the edge of the shelf or floor, and is to be two feet between every winding spokes or arms three feet long and eight inches long are placed in mortises made in the said spiral line - these arms are two inches square except where they enter the shaft they are a little thicker. these arms are to project out at right angles with the shaft and be of a convenient distance apart and they will now form a winding or threadlike appearance.

The outside of the first arm at the bottom of the shaft. is to be shaped so as to resemble the cut of an auger and the upper sides of the other arms are to be dressed off so as to correspond with the inclination of the floor. Said floor is to be made of thin boards cut out circularly so as to meet the roundness of the shaft and the extremity of each arm. these boards are inserted in the spiral groove before mentioned. their ends meeting or breaking joints on the upper side of the arms to which they are to be firmly fastened. This floor will now form one continued line from one end to the other of the shaft, and will project equally throughout the

546 X7193 upper side of the said floor must be perfectly smooth. a hoop one inch thick and two inches wide is placed on the outside edge of the floor &
[illegible] [illegible] [illegible] rims. The floor is
to be covered in, all round with thin boards or staves nailed to the aforesaid hoop. over these is to be another layer, which is to cover the joints of the first layer, taking care that both the under and outside boards shall fit as close as possible so as to be water tight. A hoop of suitable size is to be fastened on the outside of this covering in order to keep it in place. On the top is to be fixed a rim of suitable dimensions and placed at right angles with the shaft. The top of the shaft is to be elevated to three or four feet above the rim, so that a cog wheel of bevel construction may be attached to it. The gudgeon at the top of the shaft is to work in a beam. said beam to be fixed in the most convenient manner. To put this pump in operation the pivot at the bottom is placed in its support at the bottom of the water, and the gudgeon on top is fixed in the beam. said beam being so adjusted as to give such an inclination to the shaft as shall allow the water to reach from the top of one rim to the bottom of the next above: allowing the upper rim to sink a little in the water as shown in the longitudinal section The pump is put in motion by suitable machinery acting on the bevel wheel of the shaft and by the ~~[illegible]~~ construction of the floor, the water will be raised thread by thread until it falls over the rim on the top, when it will be received into a trough or conductor from which it is applied to the purposes required.

These pumps may be made of wood, or any other kind of suitable materials, and the size may be diminished or increased or made of such dimensions as shall make it easily to be turned by hand. The principle of the pump I do not pretend to, but my claim consists in the improvement on the said principle viz. by the extension of the arms the pump can be [illegible] more perpendicularly without altering the [illegible] of the threads and

X 7193 will raise twice the quantity of water without the necessity of doubling the power. In testimony that the above is a true specification of my said improvement as herein described I have hereto set my hand the first day of June one thousand Eight hundred and thirty two.

Witnesses
Benjn. Corfoot
Willm. Graham

Colton Foss.

(Pl. mts)

Patented 4 August 1832